Jan. 12, 1954    W. SIEGENTHALER ET AL    2,665,854
MULTIPLE IN-LINE SPOOLER
Filed Jan. 3, 1951    7 Sheets-Sheet 3
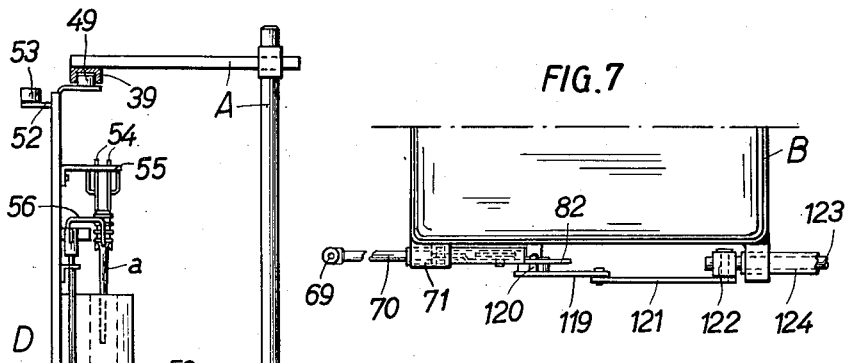
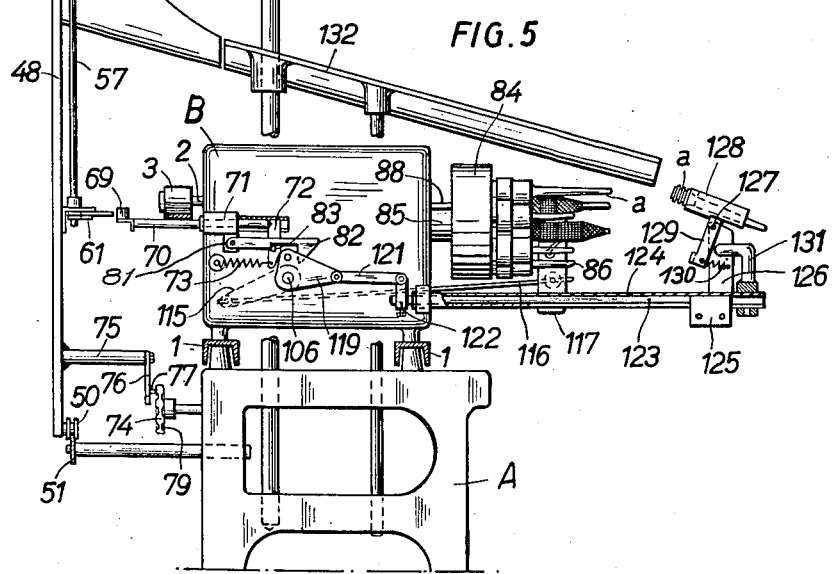
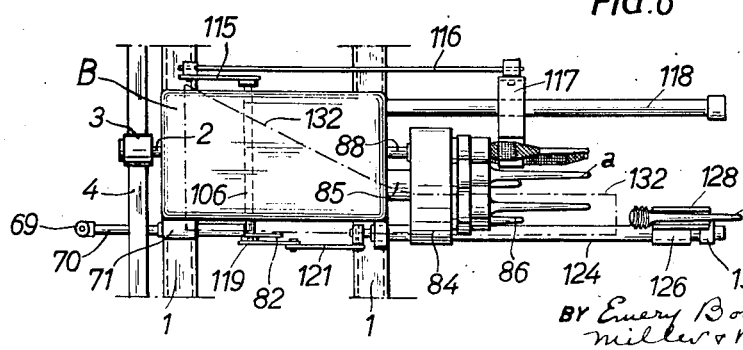
INVENTORS:
WALTER
a SIEGENTHALER
KASPAR LAAGER
BY Emery Booth Townsend
Miller & Weidner ATT'YS.

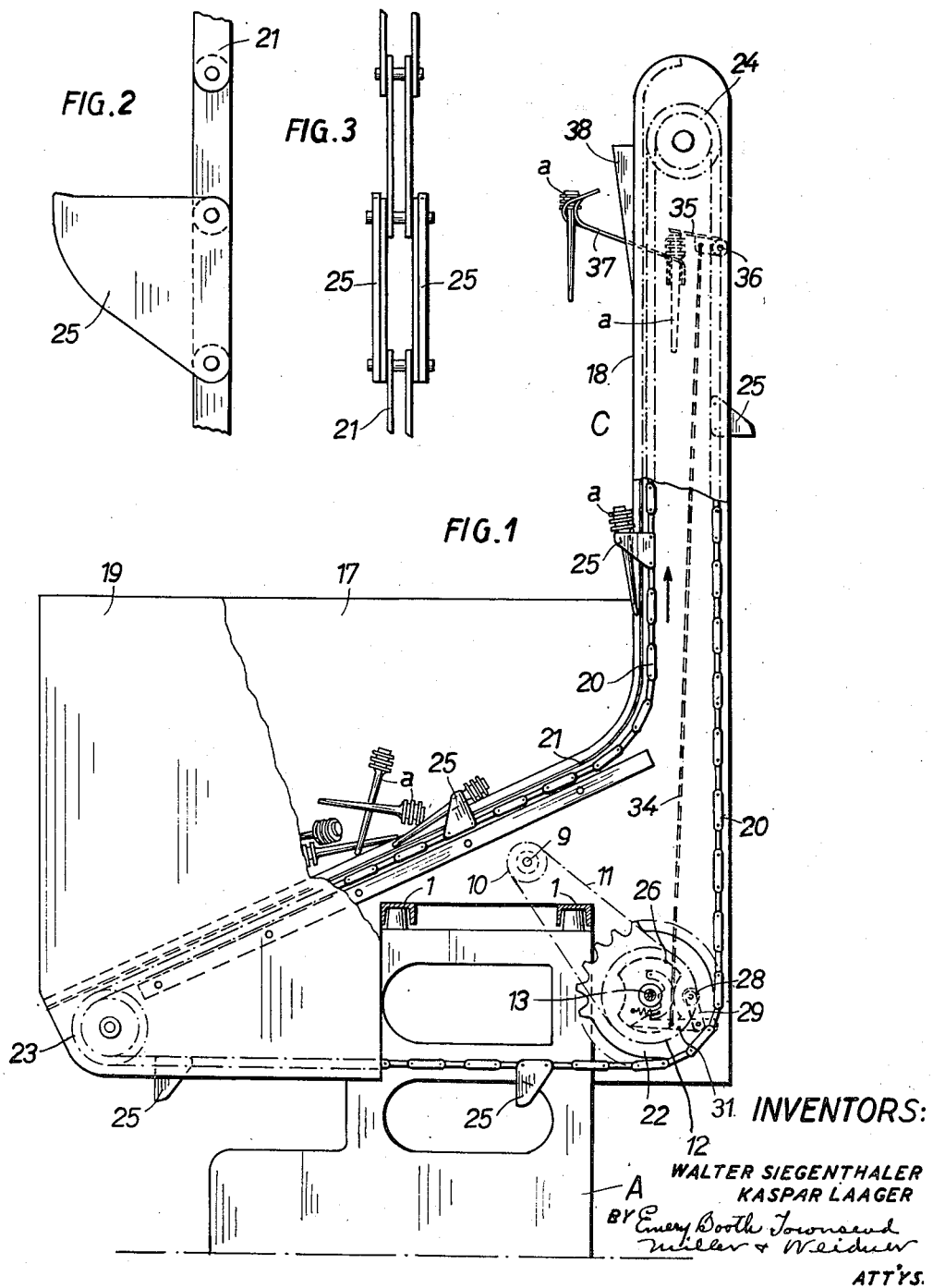

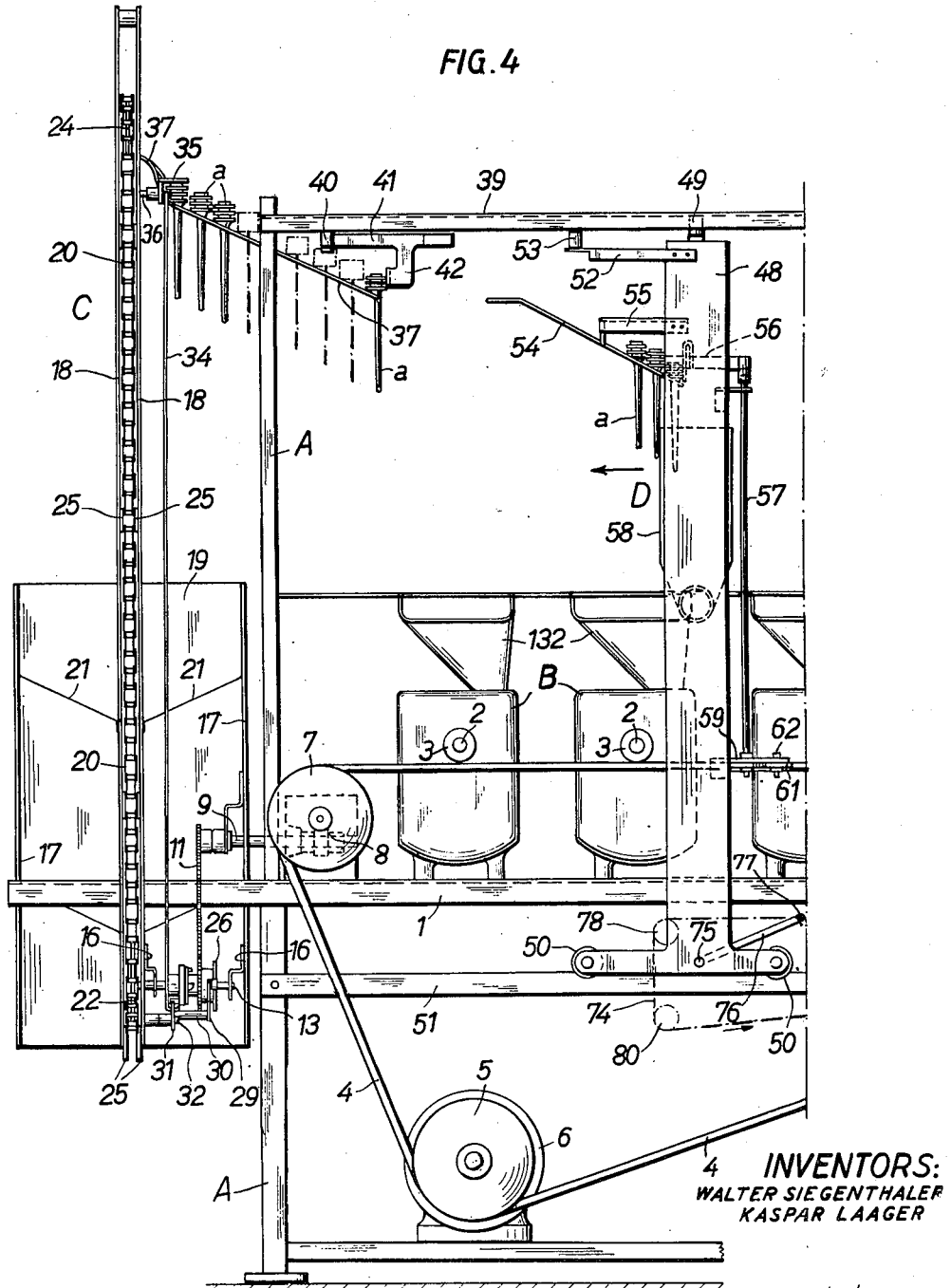

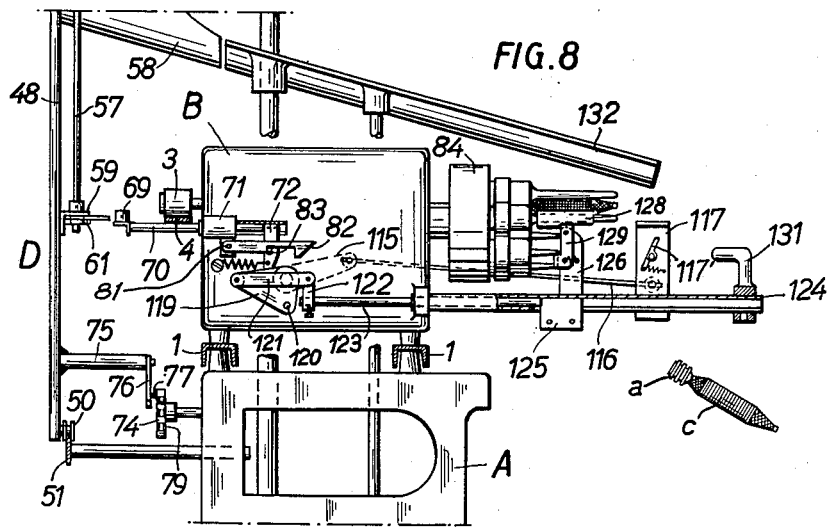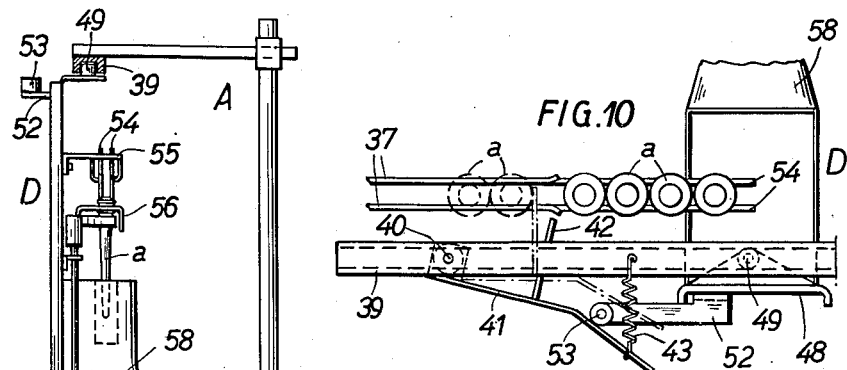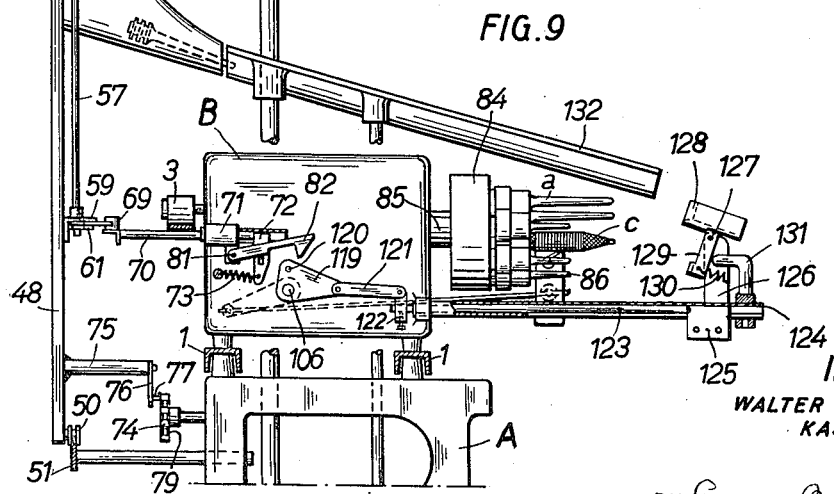

Jan. 12, 1954 W. SIEGENTHALER ET AL 2,665,854
MULTIPLE IN-LINE SPOOLER
Filed Jan. 3, 1951 7 Sheets-Sheet 5
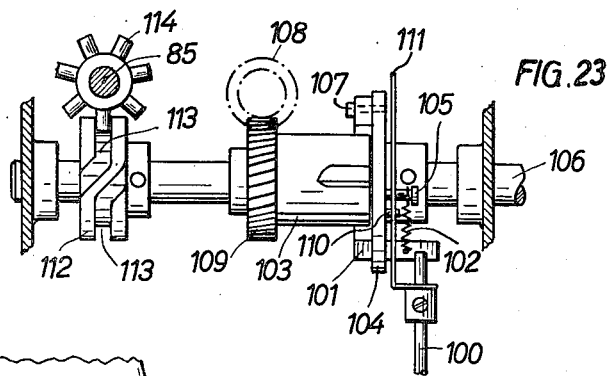
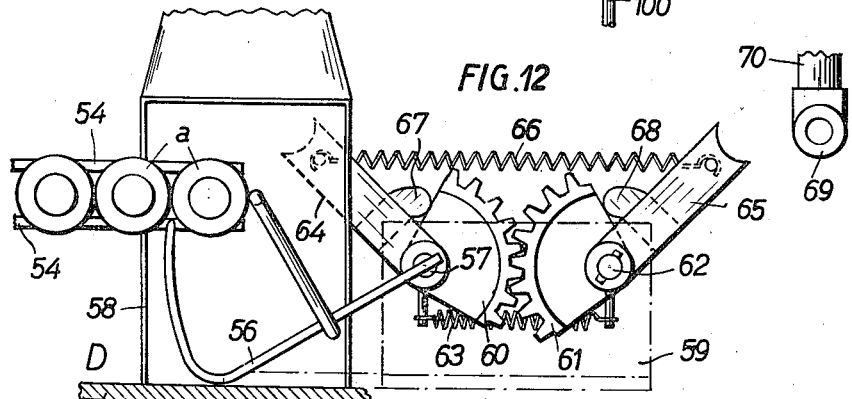
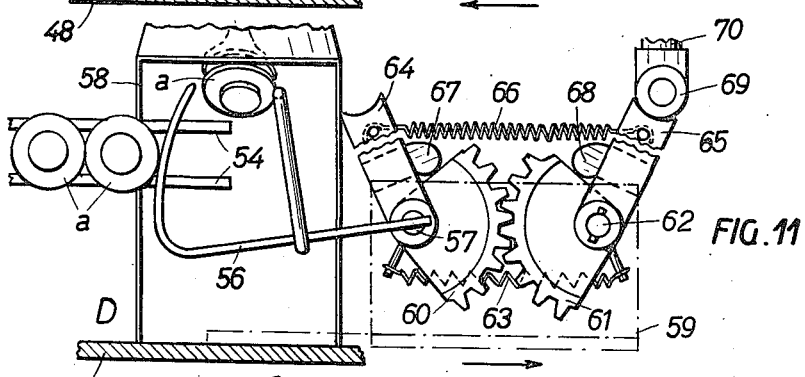
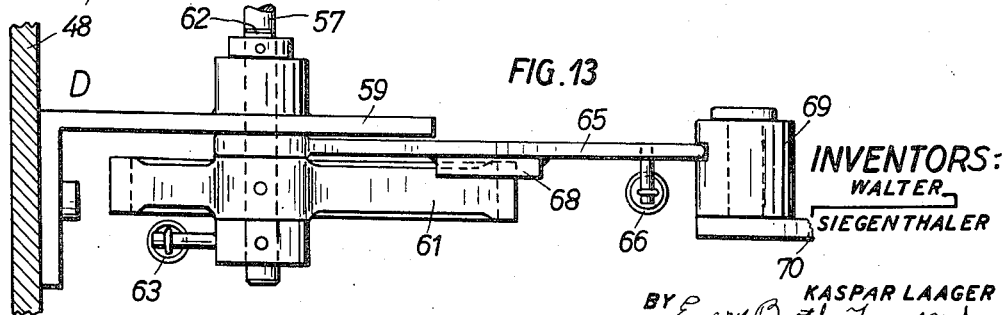
INVENTORS:
WALTER SIEGENTHALER
KASPAR LAAGER
BY Emery Booth Townsend Miller & Weidner ATT'YS.

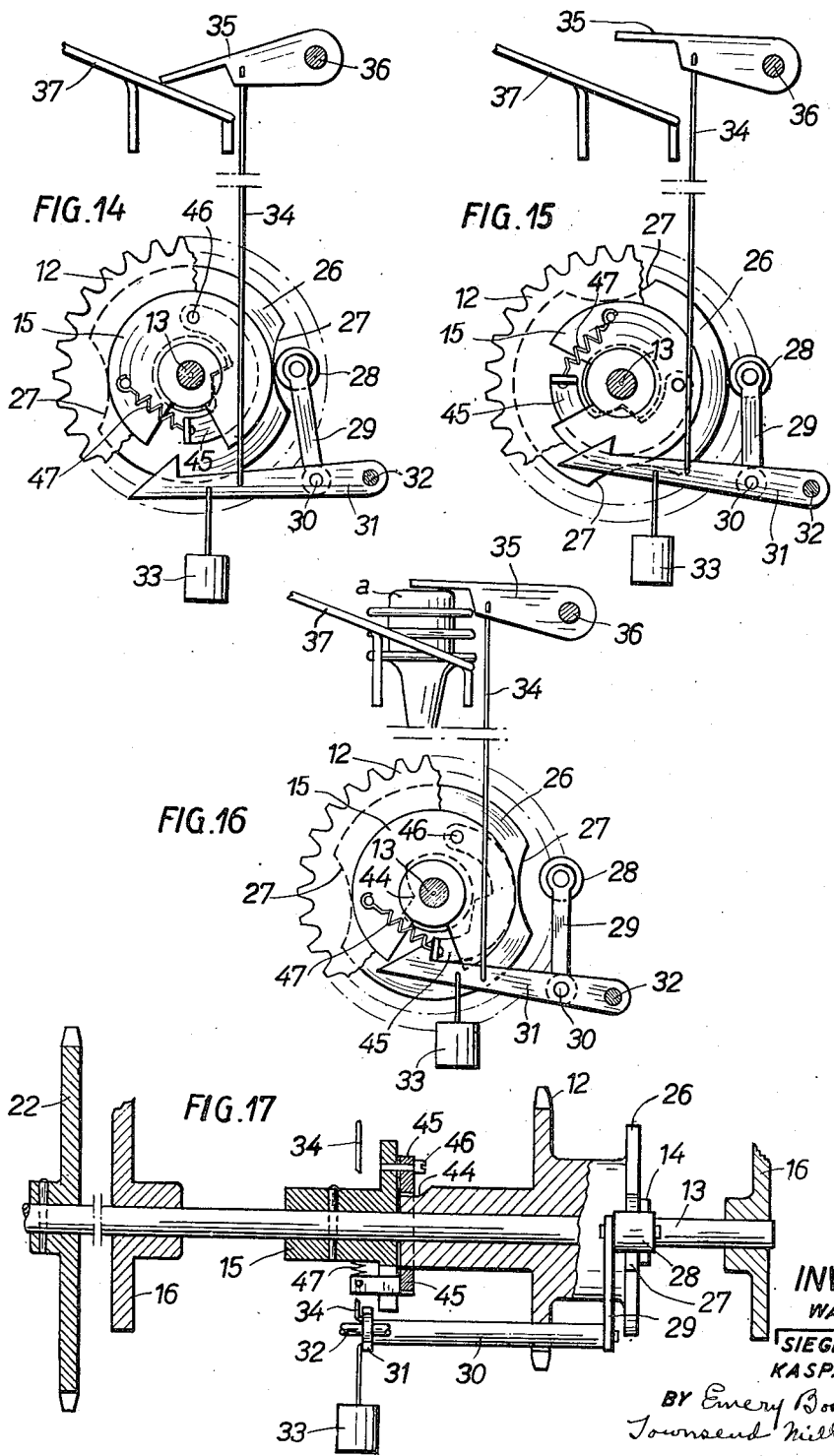

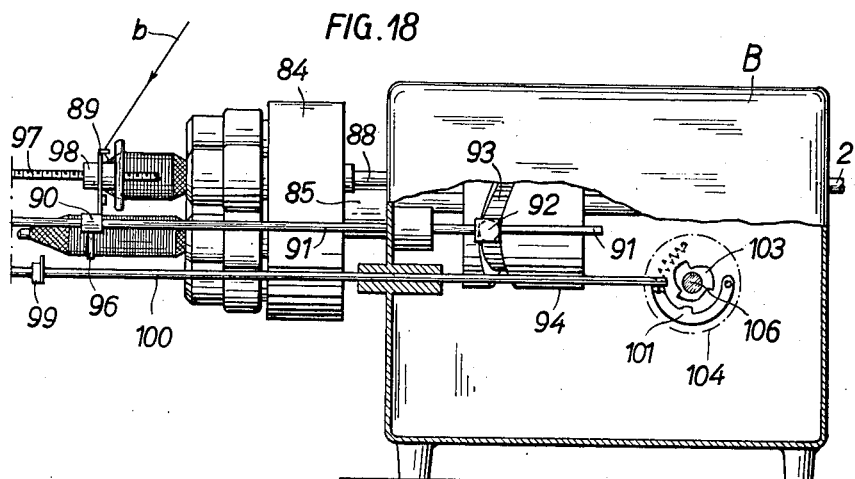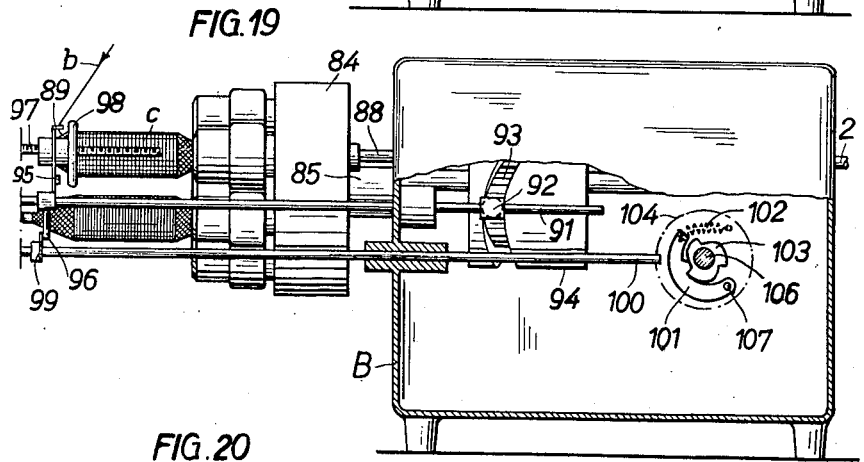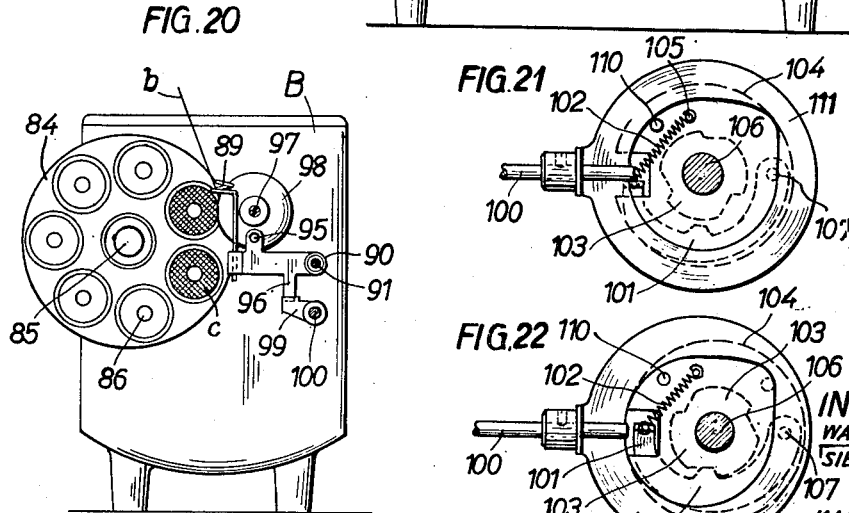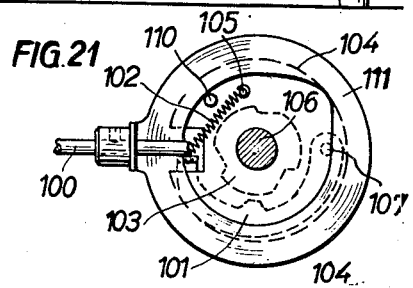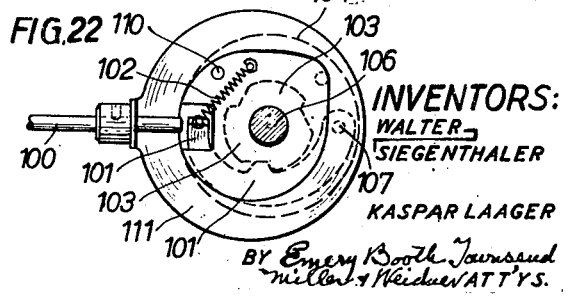

Patented Jan. 12, 1954

2,665,854

UNITED STATES PATENT OFFICE 2,665,854

MULTIPLE IN-LINE SPOOLER

Walter Siegenthaler, Erlenbach, and Kaspar Laager, Kusnacht, Switzerland, assignors to Maschinenfabrik Scharer, Erlenbach, Switzerland Application January 3, 1951, Serial No. 204,176

Claims priority, application Switzerland February 3, 1950

14 Claims. (Cl. 242—35.5)

Our present invention relates to bobbin winder frames comprising a plurality of in-line winders involving automatic bobbin-changing. In order to feed empty bobbins to the winders according to the progress of the winding operation, it is known in the art either to move the winders to a stationary bobbin magazine or to feed empty bobbins to the stationary winders by means of a conveyor.

In contra-distinction to such known arrangements, the winder frame according to our present invention comprises a motor-driven bobbin dispenser which travels on rails, and winders provided with movable dogs which, in dependency on the winding operation, are moved from an inoperative position into an operative position in order to coact with control means which are arranged on the said dispenser for the purpose of releasing an empty bobbin from the dispenser and delivering the same to the respective winder, whereupon the respective dog is returned to the inoperative position.

Such arrangement affords a relatively simple construction and a reliable mode of operation for automatically feeding empty bobbins to the winders according to the winding operation or the production of packages. As desired, a smaller or greater number of winders may be provided on the frame. An embodiment of the invention is shown in the accompanying drawings, wherein the travelling dispenser is supplied with empty bobbins by a stationary conveyer having a supply magazine associated therewith.

Fig. 1 shows a side view (partly broken away) of the stationary bobbin feeder,

Figs. 2 and 3 show, in a larger scale, a portion of a conveyor chain in side view and end view respectively, Fig. 4 shows a rear view of the frame end portion provided with the bobbin feeder, including the travelling bobbin dispenser and a few winders of which each comprises a plurality of winding pegs on a rotary body.

Fig. 5 shows an elevation (turned through 90° with respect to Fig. 4) of the frame and a winder and the travelling bobbin dispenser.

Fig. 6 shows a top plan view of a winder,

Fig. 7 shows a portion of Fig. 6 in a larger scale,

Figs. 8 and 9 show two elevations similar to Fig. 5, wherein, however, parts which serve for adjusting the dog provided on the winder, are shown in different positions, Fig. 10 shows a top plan view of a portion of the bobbin feeder and of the bobbin dispenser, for explaining the bobbin transfer from the feeder to the dispenser, Figs. 11 and 12 show a top plan view of a portion of the bobbin dispenser, including bobbin-release control means shown in different positions, Fig. 13 shows in a larger scale a side view of a portion of Fig. 11.

Figs. 14, 15 and 16 show three side views (partly broken away) for explaining the automatic operation of switching on and off the drive means of the conveyor chain associated with the bobbin feeder;

Fig. 17 shows an axial section through the said drive means,

Figs. 18 and 19 show an elevation of a winder for explaining the automatic dog adjustment, Fig. 20 shows an end view of the winder.

Figs. 21 and 22 show, in a larger scale, an auxiliary means in the engaged and disengaged position respectively, which means serves for automatically and stepwise rotating a rotary body which is mounted on the winder and carries the winding pegs, and Fig. 23 shows the said auxiliary means in a view which is turned through 90° with respect to Figs. 21 and 22.

A indicates the elongated frame, on the two rails of which a plurality, for example 10, of similar winders B are arranged in line (Fig. 4). Each winder B comprises a drive shaft 2 having a friction wheel 3 which is engaged by the belt 4 which is engaged by a pulley 5 of an electric motor 6 secured to the frame A. The belt 4 runs over two idling rollers 7 mounted at the ends of frame A. The roller 7 shown in Fig. 4, via its shaft and an intermediate gearing 8 drives a shaft 9 which via a sprocket wheel 10 and an endless chain 11 transmits its rotation to a sprocket wheel 12. The latter is rotatably mounted on a lower shaft 13, intermediate of a set collar 14 (Fig. 17) and a driver 15 pinned to shaft 13. The shaft 13 is mounted in two brackets 16 secured to walls 17 and 18 (Fig. 4) which together with two further walls 17, 18 form components of the magazine 19 provided for empty bobbins. The magazine 19 is associated with the feeder C which comprises an endless conveyor chain 20, and is fixed to the two rails 1 of frame A. The conveyor chain 20 is disposed in a space formed between the said two walls 18. Two bottom sheets 21 fixed to the walls 17 of magazine 19 extend to said space 19 and, as shown in Fig. 4, are inclined towards the latter. The empty bobbins poured loosely into magazine 19 thus have a tendency of rolling toward the conveyor chain 20. The bottom of magazine 19, formed by the sheets 21, also is parallel (see Fig. 1) to the conveyor chain 20 so that the bobbins $a$ tend to roll towards the lowest point of magazine 19, which point is opposite to frame A. Such arrangement ensures that the bobbins *a* will be entrained by the conveyor chain 20 until the stock of bobbins is exhausted. Link pairs 25 are provided at certain intervals on the conveyor chain 20 which passes over three sprocket wheels 22, 23 and 24, representing according to Figs. 2 and 3 additional chain members and serving (cf. Fig. 1) as drivers for the bobbins *a* which for transport are disposed between the two links 25. The two links 25 of each pair are so spaced from each other that they are capable of entraining the bobbins *a* in the direction of movement of the conveyor chain 20 (cf. Fig. 1) only in such position of the bobbin in which the thickened bobbin end is leading. The chain wheel 22 is pinned to the lower shaft 13 which controls the transport of empty bobbins from the magazine 19 to an upper collecting-and-delivering station. For such purpose the sprocket wheel 12 which is rotatable on the lower shaft 13, on one portion of its hub comprises a rim flange 26 which has two diametrically opposite recesses 27 and is adapted to coact with a roller 28 (see also Figs. 14–17) on an arm 29. The latter through a pin 30 is rigidly connected to a pawl 31. The pawl 31 is pivoted on a pin 32 to one wall 18 (Fig. 4) and is loaded by a weight 33. The pawl 31 by a rod 34 is connected to an upper feeler 35 which is pivoted on a pin 36 fixed to said wall 18 and serves for feeling an inclined guide slipway 37 provided for the bobbins *a*, which according to Fig. 10 comprises two parallel rails. The bobbins are introduced into the space between the two slipway rails 37 in that the bobbin *a* removed by a link pair 25 of chain 20 from the magazine 19 (Fig. 1) hits an inclined way 38 fixed to the walls 18, before the said link pair 25 has reached the sprocket wheel 24 of chain 20. The bobbin *a* thus is disengaged from the link pair 25 and drops between the slipway rails 37, is caught by the latter and slides thereon toward its lower portion. The bobbin *a* arriving at the lower end of slipway 37 is stopped by means of an arm 41 pivoted on a bolt 40 (Figs. 4, 10) to the top rail 39 of frame A. For such purpose the arm 41 is provided with a catch 42 which under the influence of a spring 43 engaging the arm 41, ordinarily extends into the path of the bobbins *a* moving on the slipway rails 37, as indicated in Fig. 10 by dotted lines. The catch 41, as required, is automatically swung to its inoperative position, as will be explained later. The hub of the sprocket wheel 12 mounted on the lower shaft 13, comprises a recess 44 on the periphery of its second portion, which recess forms a coupling means intended for coaction with a coupling arm 45 pivoted on a bolt 46 to the driver 15 which is pinned to shaft 13. A spring 47 engages the free end of arm 45 at one end and the driver 15 at the other end, and tends to engage the arm 45 to the coupling member of sprocket wheel 12, thus keeping the latter coupled to shaft 13. The sprocket wheel 12 thus transmits the rotation imparted to it by the motor 5, via shaft 13 to the sprocket wheel 22, whereby the chain 20 is moved and feeds empty bobbins *a* from the magazine 19 to the slipway 37. The upper feeler 35 which is located in the range of slipway 37 or, respectively, of the path of the moving empty bobbins *a*, thus is periodically swung back and forth on its pin 36 by the rod 34 for the purpose of feeling the said track. The rod 34 is correspondingly reciprocated by the pawl 31 which is swung back and forth on pin 32 by the rim 26 of the lower sprocket 12 by its roller arms 29, 28 as shown in Figs. 14 and 15. The swinging movement of the upper feeler 35 ceases as soon as the slipway 37 is occupied by bobbins *a* (as shown in Fig. 4) so that the feeler 35 on its downward movement hits the uppermost of the bobbins *a* collecting on slipway 37 and, thus, is held in a position (Fig. 16) in which its catch is in the path of coupling arm 45, whereupon the latter hits the said catch, the coupling arm 45 against the influence of its spring 47 is disengaged from the coupling member of sprocket 12, and the latter rotates freely on shaft 13. The shaft 13 and, thus, the sprocket wheel 22 and conveyor chain 20 are stopped, and no bobbins *a* are moved from the magazine 19 to the slipway 37. Such bobbin transport will be resumed when, owing to the release and delivery of at least the foremost bobbin *a*, the remaining bobbins have slid down the slipway 37 through a corresponding distance. The foremost bobbin *a* leaving the slipway 37 moves on to the bobbin dispenser D which delivers bobbins to the winders B.

The bobbin dispenser D comprises a stand 48 which is movable lengthwise of frame A, engaging the upper U-section rail 39 of frame A by means of a top roller 49 and being supported at the bottom on a rail 51 of frame A (Fig. 4) by means of two grooved rollers 50 (Fig. 4). A top roller 53 is mounted on a top arm 52 of stand 48 and coacts with the arm 41 mounted on rail 39. The catch 42 of arm 41 controls the transition of the foremost bobbin *a* from the fixed slipway 37 to a guide 54 extending from stand 48 and, similar to the slipway 37, comprising two parallel rails. The latter according to Fig. 4 are secured to an arm 55 which projects from stand 48 and has two depending connecting legs at its respective end. When the bobbin dispenser D on its travel in direction of the arrow shown in Fig. 4, is nearing the end of its stroke, the guide 54 moves underneath the fixed slipway 37, the arm 41 through the top roller 53 (as shown in Fig. 10) being swung against the action of spring 43, so as to release the foremost bobbin *a* on the fixed slipway 37. The released bobbin, perhaps together with other bobbins sliding along, then is caught by the inclined portion of guide 54 and slides toward the lower end thereof. A locking-and-releasing means 56 (Figs. 11, 12) associated with the lower end of guide 54 controls the bobbin delivery, for which purpose the said means is bifurcated and fixed to the upper end of a control shaft 57 mounted on the stand 48. The mode of operation of the means 56 can readily be seen from Figs. 11 and 12. The bobbin *a* released on the guide 54 is caught in a chute 58 which is disposed on the stand 48, and forwarded in a different direction. The chute 58 is tapered downwardly so that the bobbin *a* at the lower end of the well or, respectively, on leaving the same is guided in its proper position.

The upright control shaft 57 at the foot bears on a plate 59 secured to stand 48. A toothed segment 60 is pinned to the foot of shaft 57 and engages another toothed segment 61 which is fixed to a stud 62 which also is disposed on the plate 59. The two toothed segments 60 and 61 are influenced by a common spring 63. A control arm 64 and 65 respectively, is pivoted on the control shaft 57 and stud 62, which two arms are interconnected by a spring 66 which tends to hold the arms in a position in which by means of a lower dog 67 and 68, respectively, they abut against a side edge of the corresponding toothed segment 60 and 61 respectively. The pairwise associated toothed segments and control arms thus are positively coupled in one direction of rotation, whilst the control arms may swing relatively in the other direction. The two control arms 64 and 65, by coacting with an abutment roller 69 provided on each winder B, are intended to temporarily turn the control shaft 57 out of its inactive position in order to release the foremost of the bobbins $a$ which have accumulated on the guide 54 of stand 48. When the bobbin dispenser D moves in direction of the arrow shown at the bottom of Fig. 11, the control arm 65 enters into action, whilst when moving in direction of the arrow shown in Fig. 12, the control lever 64 enters into action when striking against a roller 69 which is in advanced position, i. e. in a position of readiness. The respective control arm then engages the roller 69, as may be seen from Fig. 11, whereby the control shaft 57 is turned as required. At the same time, the roller 69 is moved by said arm, and a rod 70 which carries the roller 69 and is slidably guided on the casing of the respective winder B, is moved rearwardly. The rod 70 traverses a boss 71 provided on the said casing, and comprises a depending arm 72 engaged by a spring 73. By virtue of said relative movement between control arm 64 or 65, respectively, and toothed segment 60 or 61, respectively, each control arm can become active only in the indicated direction of travel of the bobbin dispenser D, whilst the other control arm only can swing idly in the range of the roller 69 and then, under the influence of spring 66, through its lower dog again abuts against the edge of the appurtenant toothed segment.

The to-and-fro travel of the bobbin dispenser D is brought about by an endless chain 74 provided on frame A, the bobbin dispenser D through a bolt 75, a rod 76 and a coupling pin 77 being connected to said chain. The chain 74, according to Fig. 4, runs over a sprocket wheel 78 journaled in the frame A and over a sprocket wheel 79 (Fig. 5) disposed on the other end portion of frame A. The wheel 79 is driven via an auxiliary gearing (not shown) which is disposed on the respective end portion of frame and is positively coupled to the shaft of the respective reversing roller 7 of belt 4. Additional sprocket wheels are provided between the two wheels 78 and 79 for supporting the upper section of chain 74. As shown in Fig. 4, the driving chain 74 first runs downwardly from the sprocket wheel 78 and from a lower sprocket wheel 80 to the wheel 79. Due to such downward run of the driving chain 74, the bobbin dispenser D is temporarily stopped on the respective end of its stroke. Such arrangement permits of feeding the bobbin dispenser D with as many empty bobbins $a$ from the fixed slipway 37 as the inclined section of guide 54 is capable of accommodating. On the rearward travel of the bobbin dispenser D, the catch 41 is released again by the roller 53 so that the catch through spring 43 is swung back to its operative position (shown by dash-and-dot lines in Fig. 10).

When on a winder B, the carrier rod 70 with roller 69 is slid back under the action of either control lever 64 or 65 and against the action of spring 73, a pawl 82 (Figs. 5 and 8) pivoted on a pin 81 to the winder casing is engaged to a transverse pin 83 which is provided on the depending arm 72 of carrier rod 70. The latter then is clamped in the withdrawn position until the pawl 82 is swung upwardly, as required, to slide the rod 70 under the action of the spring 73 which engages said arm 72, forwardly again to its position of readiness (Fig. 9). This upward swing of pawl 82 takes place automatically in dependency on the winding operation, as will be explained later.

Each winder B comprises a rotary member 84 which by means of a central shaft 85 is disposed on the winder casing and carries seven uniformly-spaced winding-pegs 86 of which each is adapted to accommodate a bobbin. By automatically turning the member 84 step by step, the bobbins are successively delivered to a working station in which the respective winding peg 86 is automatically coupled to a driving spindle 88 which is axially movable in the winder casing. The thread $b$ is fed via a guide 89 to the bobbin present at the working station, the said guide being carried by a bush 90 disposed on a rod 91 which is axially movable on the winder casing. When the winder is in operation, the rod 91 is reciprocated by a driver 92 from the cam groove 93 of a rotating drum 94. Two stops 95 and 96 (Fig. 20) are provided on the carrier of the thread guide 89, of which the first is adapted to coact with a feeler 98 mounted on a guide rod 97, whilst the second stop is adapted to coact with a dog 99 which is secured to an axially movable control rod 100. During the winding operation, the feeler 98—which in known manner feels the periphery of the package $c$ being built up—is moved on rod 97, and the bush 90 through stop 95 is moved step-by-step on rod 91. A locking mechanism of known type disposed in bush 90, prevents an unintentional return of bush 90 on rod 91. When the package $c$ on the bobbin has attained the predetermined size, the stop 96 which together with bush 90 has been moved forward, hits the dog 99 which is fixed to rod 100, whereupon the rod 100 is moved accordingly over a certain distance. A spring-loaded counterholder (not shown) thus is disengaged by additional auxiliary means, which counterholder until now has secured the completely wound bobbin on its seat or on peg 86 respectively. The moving rod 100 trips a coupling arm 101 which had been locked by said rod, and which thus through a spring 102 is engaged to a coupling sleeve 103, thus coupling the latter to a disc 104. The spring 102, as shown in Fig. 23, at one end engages the disc 104 through a stud 105, and the hub of said disc is rigidly connected to an auxiliary shaft 106. The other end of spring 102 is connected to the bent end leg of coupling arm 101, which leg coacts with the rod 100. The disc 104 to which the coupling arm 101 is pivoted on a pin 107, is taken along by the coupling sleeve 103 during one revolution, which sleeve is continuously rotated through a helical gearing 108, 109. A stud 110 fixed to disc 104, having reached the position shown in Fig. 22 by dash-and-dot lines, causes such a movement of a ring 111 fixed to rod 100 that the latter is withdrawn again and moves into the path of said leg of arm 101, which then contacts rod 100 and is again disengaged thereby in the sense of Fig. 21, thus switching off the drive of shaft 106. A cam 112 mounted on the latter rotates therewith, and a groove 113 in cam 112 indexes a spider 114. The spider 114 is pinned to the shaft 85 of the rotary body 84 which carries the winding pegs 86, the body 84 thus being indexed to move an empty bobbin $a$ to the winding station of the winder. The said counterholder then again engages the free end of said bobbin.

Prior to the indexing movement of body 84, the wound bobbin removed from the winding station during the previous indexing of body 84, is automatically ejected and an empty bobbin put on a winding peg 86 of body 84, as will be presently described.

During the rotation of shaft 106, which takes place after a bobbin has been fully wound, an outer arm 115 (Figs. 5, 6, 8) rigidly connected to shaft 106 performs one complete revolution and through a link 116 reciprocates a slide 117 on a rod 118. During such reciprocation, the slide 117 by means of a spring-loaded flap 117' (Fig. 8) contacts from the rear the package c of the bobbin to be ejected which thus is taken along and stripped off the respective winding peg 86, whereupon the bobbin drops into a collecting container.

An outer link 119 pinned to auxiliary shaft 106 performs a complete revolution together with the latter. The link 119 is of triangular shape, comprises a laterally projecting stud 120 to coact with the pawl 82 pivoted to the winder casing, and is connected via a second link 121 and a third link 122 to a bar 123 which is slidingly guided in a tube 124 rigidly secured to the winder casing. A plate 125 fixed to bar 123 projects through a longitudinal slot provided on the underside of tube 124 and has an upright lug 126. A holder 128 slotted on top is pivoted to the lug 126 on a pin 127 and has a depending arm 129 engaged by a spring 130. An angular stop 131 is associated to arm 129 and thus to holder 128, being rigidly mounted on the free end of tube 124.

According to Fig. 5, the arm 129 of holder 128 abuts against the fixed stop 131, the said holder being inclined at an angle and a direction corresponding to those of a chute 132 (shown by dash-and-dot lines in plan in Fig. 6) disposed on the frame A in the range of the respective winder B. The bottom portion of chute 132 is tubular, whilst its top portion is of funnel shape, i. e. it has a mouth elongated in direction of the track of bobbin dispenser D, as shown in Fig. 4, which permits of receiving the released empty bobbins a delivered from the chute 58 of the dispenser D while the latter is moving. The latter therefore does not have to be stopped for the purpose of feeding the winders C. The empty bobbin a moving down the chute 132 then is caught by the inclined holder 128, the bobbin head according to Fig. 5 facing the body 84 of the winder B.

During the first half revolution of the auxiliary shaft 106, the lug 126 is moved through link 119 and bar 123 from the position shown in Fig. 5 towards the body 84, the holder 128 mounting the empty bobbin a carried thereby on to a free winding peg 86 of the body 84. Prior to such operation, the holder 128 through spring 130 has been rocked into a horizontal position in which an end leg projecting from the arm 129 abuts against lug 126. During the second half revolution of shaft 106, the lug 126 and bobbin holder 128 are returned to the starting position by the slide bar 123, thus reestablishing the previous condition in which the holder 128 is in catching position. During such second half revolution of shaft 106, on the other hand, the pawl 82 pivoted to the winder casing is rocked upwardly by the stud 120 fixed to link 119, thus being disengaged from the stud 83 of the arm 72 fixed to rod 70, as shown in Fig. 9. The rod 70 under the influence of spring 73, thus is moved again so that the roller 69 again is made ready for operation. That condition thus is re-established on the winder in which an empty bobbin a is released by the roller 69 from the travelling bobbin dispenser D and delivered to the holder 128 for the purpose of being mounted on a peg 86 of rotary body 84.

The winder frame also may be such that the bobbin feeder and the travelling bobbin dispenser form a structural unit. The machine furthermore may be constructed so that the travelling bobbin dispenser moves on a closed track in only one direction, instead of back and forth, in which case the bobbin dispenser supplies empty bobbins to winders arranged in two opposite rows.

What we claim is:

1. In a winding frame having a plurality of winders arranged in line and involving automatic bobbin-changing means, the improvement defined by the provision of a bobbin dispenser structure movable by motor means to reciprocate continuously and uninterruptedly along the line of winders on a track fixed to said frame, a reciprocatable part mounted on each of said winders for presenting empty bobbins endwise to the winder and placing them thereon, a reciprocable dog associated with said part and operated thereby, control means mounted on said structure, the said dogs being consecutively operable to move from an inoperative to an operative position in accordance with the bobbin-changing operation in order to coact with said control means for the purpose of consecutively releasing from said structure an empty bobbin and moving the same to the respective winders, and to return to the inoperative position, the bobbin dispenser comprising a bobbin locking-and-releasing device for the empty bobbins, which device in both directions of reciprocation of the bobbin dispenser cooperates with said control means to be operated thereby for delivering empty bobbins to the winders.

2. In a winding frame as set out in claim 1, the further improvement defined by a bobbin feeder associated with the bobbin dispenser structure and having a magazine for empty bobbins, a conveyor means for forwarding the latter to a slipway extending to the bobbin feeder, the said slipway being adapted to accommodate a plurality of bobbins, and a feeling device biasable by the store of bobbins present on said slipway, the drive of said conveyor means being stopped and restarted with the aid of said feeling device in accordance with the accumulation of bobbins on said slipway or with the dispatch of bobbins to the dispenser respectively.

3. In a winding frame as set out in claim 2, the further improvement defined by the provision of a feeling lever in said feeling device, and a clutch associated with the drive of the conveyor means, the said lever being instrumental in alternatively throwing the clutch into and out of engagement.

4. In a winding frame as set out in claim 2, the further improvement defined by the provision of a first chute mounted on the bobbin dispenser, and a second chute mounted on the frame at each winder, the empty bobbins without interrupting the travel of the dispenser being delivered through the first chute to the second chute which has an inlet which is elongated in the direction of the bobbin-dispenser track.

5. A winding frame as set out in claim 2, in which the bobbin feeder is stationary and the bobbin dispenser moves back and forth over a given portion of said track, and in which a catch is pivoted to the frame at one end of said track, the said catch being released by said dispenser on approaching the respective end of its stroke for the purpose of delivering empty bobbins from the slipway to the dispenser.

6. A winding frame as set out in claim 5, in which the traveling bobbin dispenser comprises a guide for receiving a plurality of empty bobbins, supplied to it via the slipway which is fed with empty bobbins by the said conveyor means, and in which a locking-and-releasing device is associated with the guide provided on the bobbin dispenser and is biasable through the control means mounted on the bobbin dispenser for the purpose of delivering an empty bobbin to the respective winder.

7. A winding frame as set out in claim 6, in which the bobbin feeder is stationary and one side of said feeling device comprises a portion of the guide which is supplied with empty bobbins from the magazine by the conveyer means.

8. In a winding frame having a plurality of winders arranged in line and involving an automatic bobbin-changing mechanism each, the improvement defined by the provision of a bobbin dispenser structure movable by motor means to reciprocate continuously and uninterruptedly along the line of winders on a track fixed to the frame, a reciprocable dog mounted on each winder, control means mounted on said structure, the said dog being reciprocable between an inoperative and an operative position in accordance with the bobbin-changing operation in order to coact with said control means for the purpose of releasing from the dispenser an empty bobbin and moving the same to the winder, a bobbin feeder associated with said dispenser and having a magazine for empty bobbins, and a conveyor chain comprising spaced pairs of spaced links acting as catches for the empty bobbins for forwarding the latter to a slipway extending to the bobbin feeder and being adapted to accommodate a plurality of bobbins, a feeling device biasable by the store of bobbins present on the slipway, the said conveyor chain being stopped and restarted with the aid of said feeling device in accordance with the accumulation of bobbins on said slipway or with the dispatch of bobbins to the dispenser respectively, the bobbin dispenser comprising a bobbin locking-and-releasing device for the empty bobbins, which device in both directions of reciprocation of the bobbin dispenser cooperates with said control means to be operated thereby for delivering empty bobbins to the winders.

9. A winding frame as set out in claim 8, in which the said chain in the range of the magazine is disposed in an intermediate space, bottom parts springing from lateral walls of the magazine are provided which are inclined toward the said intermediate space, for guiding the empty bobbins to the conveyer chain, and in which the magazine bottom is inclined in the direction of movement of said chain so that the stored bobbins tend to move towards the lowest point of the magazine.

10. In a winding frame having a plurality of winders arranged in line and involving an automatic bobbin-changing mechanism each, the improvement defined by the provision of a bobbin dispenser structure movable by motor-driven means to reciprocate continuously and uninterruptedly along the line of winders, a reciprocable dog mounted on each winder, control means mounted on said structure, the said dog being reciprocable between an inoperative position and an operative position in dependency on the bobbin-changing mechanism in order to co-act in the operative position with said control means for the purpose of releasing from said dispenser an empty bobbin and moving the same to the respective winder, and two control arms mounted on said dispenser to coact with the reciprocable dogs of the winders, the said arms being operable in one and the other direction of reciprocation, respectively, of the bobbin dispenser.

11. A winding frame as set out in claim 10, in which the two control arms co-act with a common, control shaft which controls the locking-and-releasing device provided on the bobbin dispenser for the bobbins thereof.

12. A winding frame as set out in claim 11, in which one of said control arms is pivoted to the control shaft, a first toothed member is rigidly secured to said shaft, a second toothed member disposed on the bobbin dispenser, the other control arm being pivoted to the shaft of the second toothed member, and the two control arms being spring-loaded so as to rotate either of the toothed members when rotating in the direction of action.

13. In a winding frame having a plurality of winders arranged in line and involving an automatic bobbin-changing mechanism each, the improvement defined by the provision of a bobbin dispenser movable by motor-driven means, a reciprocable part mounted on each of said winders for presenting empty bobbins endwise to the winder and placing them thereon, which part has associated therewith a reciprocable dog mounted on a spring-loaded rod which is movably guided on each winder, a locking mechanism coacting with said rod and adapted to be triggered in dependency on the progress of the winding operation so as to move the said dog into the operative position, control means mounted on said dispenser, the said dog being operable to move from an inoperative to the operative position in order to co-act with said control means for the purpose of releasing from the dispenser an empty bobbin and moving the same to the respective winder, a holder for receiving the bobbin moved to the winder, each winder comprising a rotary body carrying a plurality of pegs each for receiving a bobbin, a spindle for driving said pegs for winding the bobbins, mechanism for automatically indexing said body to move said pegs to said spindle and coordinately mounting the bobbin received by the holder on one of said pegs.

14. A winding frame as set out in claim 13, in which the holder is open on top and in cooperation with a stationary stop is held in an inclined position of readiness and, after receiving an empty bobbin, is moved towards the said body and thus swings to a horizontal position.

WALTER SIEGENTHALER.
KASPAR LAAGER.

References Cited in the file of this patent

UNITED STATES PATENTS

| Number | Name | Date |
|---|---|---|
| 2,225,848 | Siegenthaler | Dec. 24, 1940 |
| 2,234,355 | Reiners | Mar. 11, 1941 |
| 2,236,300 | Reiners | Mar. 25, 1941 |
| 2,245,305 | Siegenthaler | June 10, 1941 |
| 2,350,927 | Reiners | June 6, 1944 |
| 2,409,639 | Marcellus | Oct. 22, 1946 |

FOREIGN PATENTS

| Number | Country | Date |
|---|---|---|
| 631,476 | Great Britain | Nov. 3, 1949 |